(12) United States Patent
Fujimine et al.

(10) Patent No.: US 6,376,400 B1
(45) Date of Patent: Apr. 23, 2002

(54) LOW MELTING POINT GLASS FOR COVERING ELECTRODES, AND GLASS CERAMIC COMPOSITION FOR COVERING ELECTRODES

(75) Inventors: Satoshi Fujimine, Kanagawa; Siro Ootaki, Fukushima; Tsuneo Manabe; Kazuhiko Yamanaka, both of Kanagawa; Masamichi Tanida, Fukushima; Yumiko Aoki, Kanagawa, all of (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 09/512,470

(22) Filed: Feb. 24, 2000

(30) Foreign Application Priority Data

Feb. 25, 1999 (JP) ............................................. 11-048795

(51) Int. Cl.⁷ ............................... C03C 3/14; C03C 3/072

(52) U.S. Cl. ............................... 501/49; 501/15; 501/17; 501/18; 501/50; 501/75; 501/76; 428/426

(58) Field of Search ............................... 501/15, 17, 18, 501/49, 50, 75, 76; 428/426

(56) References Cited

U.S. PATENT DOCUMENTS

| | | | | |
|---|---|---|---|---|
| 4,256,495 A | * | 3/1981 | Kawamura et al. | 501/15 |
| 4,766,346 A | * | 8/1988 | Weiss et al. | 501/15 |
| 5,792,716 A | * | 8/1998 | Vasudevan et al. | 501/20 |
| 5,948,537 A | * | 9/1999 | Onada et al. | 501/76 |
| 6,010,973 A | * | 1/2000 | Watanabe et al. | 501/20 |
| 6,163,106 A | * | 12/2000 | Sugawara et al. | 501/17 |

FOREIGN PATENT DOCUMENTS

| | | | |
|---|---|---|---|
| JP | 2-273439 | | 11/1990 |
| JP | 10-112265 | | 4/1998 |
| JP | 10-241571 | | 9/1998 |
| JP | 10-316451 | | 12/1998 |
| JP | 11-343138 | * | 12/1999 |
| JP | 2001-48577 | * | 2/2001 |

* cited by examiner

*Primary Examiner*—Karl Group
(74) *Attorney, Agent, or Firm*—Oblon, Spivak, McClelland, Maier & Neustadt, P.C.

(57) ABSTRACT

A low melting point glass for covering electrodes, consisting, as represented by mass percentage based on the following oxides, essentially of:

| | Mass percentage |
|---|---|
| PbO | 20 to 60%, |
| $Bi_2O_3$ | 0 to 30%, |
| $B_2O_3$ | 20 to 55%, |
| $SiO_2$ | 0 to 10%, |
| $Al_2O_3$ | 0 to 15%, |
| MgO + CaO | 0 to 35%, |
| SrO | 0 to 35%, |
| BaO | 0 to 35%, |
| ZnO | 0 to 8%. |

11 Claims, 1 Drawing Sheet

LOW MELTING POINT GLASS FOR COVERING ELECTRODES, AND GLASS CERAMIC COMPOSITION FOR COVERING ELECTRODES

BACKGROUND OF THE INVENTION

1. Field of the Invention

The present invention relates to a low melting point glass suitable for covering for insulation of transparent electrodes of e.g. ITO (indium oxide doped with tin) or tin oxide (inclusive of tin oxide doped with e.g. fluorine or antimony), and a plasma display device.

2. Discussion of Background

In recent years, a thin flat plate type color display device has attracted an attention. In such a display device, it is necessary to form an electrode for each pixel in order to control the display state in the pixel for forming an image. In order to prevent deterioration of the image quality, transparent electrodes are used as such electrodes. As the transparent electrodes, thin films of ITO or tin oxide formed on a glass substrate, are commonly employed.

Especially, transparent electrodes which are formed on the surface of a glass substrate to be used as a display panel of the above display device, are formed into fine lines to realize fine images. In order to control the respective pixels independently, it is necessary to secure insulation among such finely formed transparent electrodes. However, if moisture is present on the surface of the glass substrate, or if an alkali component is present in the glass substrate, it may happen that an electrical current flows to some extent via the surface of this glass substrate. To prevent such a current, it is effective to form an insulating layer between the transparent electrodes. Further, in order to prevent deterioration of the image quality by the insulating layer formed between the transparent electrodes, such an insulating layer is preferably transparent.

Various materials are known as an insulating material for forming such an insulating layer. Among them, a glass material is widely employed which is a transparent and highly reliable insulating material.

For a front substrate of a plasma display device which is recently expected as a large size flat color display device (typically a display device having cells defined and formed by a front substrate used as a display surface, a rear substrate and barrier ribs and designed to generate plasma discharge in the cells to form an image, which will be referred to as PDP), a glass-covering layer excellent in plasma durability is essential to protect the above transparent electrodes from plasma.

Further, also with respect to the rear substrate of PDP, electrodes formed thereon will be covered by a glass covering layer. For this glass covering layer, high light reflectance is required in many cases to effectively use a light generated by plasma from a phosphor formed on barrier ribs, as a display light, and a light-shielding property may sometimes be required to prevent leakage of the above light from the rear substrate.

Such a glass covering layer may be formed by a method of forming it in vacuum by e.g. sputtering. However, it has been common to employ a method wherein a low melting point glass powder is made into a paste, which is coated and fired on a glass substrate.

Further, electrodes are required to be exposed at the wiring portions connected to a driving circuit. Heretofore, it has been common to cover the wiring portions connected to a driving circuit by means of a ZnO-containing paste excellent in solubility in an acid, which is separate from the paste to be used for the glass covering layer and to finally remove the covering by means of an acidic solution such as dilute nitric acid, as disclosed, for example, in JP-A-6-267424.

To suppress the reaction between transparent electrodes, and a glass covering layer at the time of forming the glass covering layer on the transparent electrodes by firing a low melting point glass powder, JP-A-7-105855 discloses a glass covering layer having a double layer structure which comprises a high softening point glass layer as the lower layer and a low softening point glass layer as the upper layer. However, there has been a problem that the number of process steps increases as compared with a glass covering layer having a single layer structure.

Further, a conventional glass covering layer has had a high dielectric constant. Therefore, the capacitance of cells tends to be large, and the discharge current per plasma emission tends to be large, whereby there has been a problem that the electric power consumption of PDP is high. JP-A-8-77930 discloses a glass covering layer having a relative dielectric constant of at most 8, but a protective layer is formed between the electrodes and the glass covering layer in order to prevent the reaction between the electrodes and the glass covering layer or to prevent diffusion of the alkali cation in the glass covering layer to the electrodes. Hereinafter, a relative dielectric constant will be referred to simply as a dielectric constant.

Further, with respect to the exposure of electrodes at the wiring portions connected to a driving circuit, JP-A-10-316451 discloses use of a glass covering layer readily soluble in an acid. It is thereby possible to avoid an increase of process steps or an increase in the number of covering materials, as it is unnecessary to apply a separate covering at the wiring portions connected to a driving circuit. However, the dielectric constant of the glass covering layer disclosed in this publication is as high as 15, whereby the above-mentioned problem relating to the dielectric constant still remains.

SUMMARY OF THE INVENTION

It is an object of the present invention to provide a low melting point glass for covering electrodes, whereby a glass covering layer can be made to have a single layer structure, the dielectric constant is low and no separate covering is required at the wiring portions connected to a driving circuit, a glass ceramic composition for covering electrodes whereby no separate covering is required at wiring portions connected to a driving circuit, and a plasma display device using the above low melting point glass for covering electrodes and/or the glass ceramic composition for covering electrodes.

The present invention provides a low melting point glass for covering electrodes, consisting, as represented by mass percentage based on the following oxides, essentially of:

|        | Mass percentage |
|--------|-----------------|
| PbO    | 20 to 60%,      |
| $Bi_2O_3$ | 0 to 30%,    |
| $B_2O_3$  | 20 to 55%,   |
| $SiO_2$   | 0 to 10%,    |
| $Al_2O_3$ | 0 to 15%,    |
| MgO + CaO | 0 to 35%,    |

-continued

| | Mass percentage |
|---|---|
| SrO | 0 to 35%, |
| BaO | 0 to 35%, |
| ZnO | 0 to 8%. |

Further, the present invention provides a glass ceramic composition for covering electrodes, which comprises 100 parts by mass of a powder of the above-mentioned low melting point glass for covering electrodes and from 0.5 to 40 parts by mass of a powder of an inorganic pigment.

Still further, the present invention provides a plasma display device having a front substrate, wherein transparent electrodes formed on a glass substrate constituting the front substrate, are covered by the above-mentioned low melting point glass for covering electrodes.

Furthermore, the present invention provides a plasma display device having a rear substrate, wherein electrodes formed on a glass substrate constituting the rear substrate, are covered by a fired product of the above-mentioned glass ceramic composition for covering electrodes.

DETAILED DESCRIPTION OF THE PREFERRED EMBODIMENTS

Figure 1:
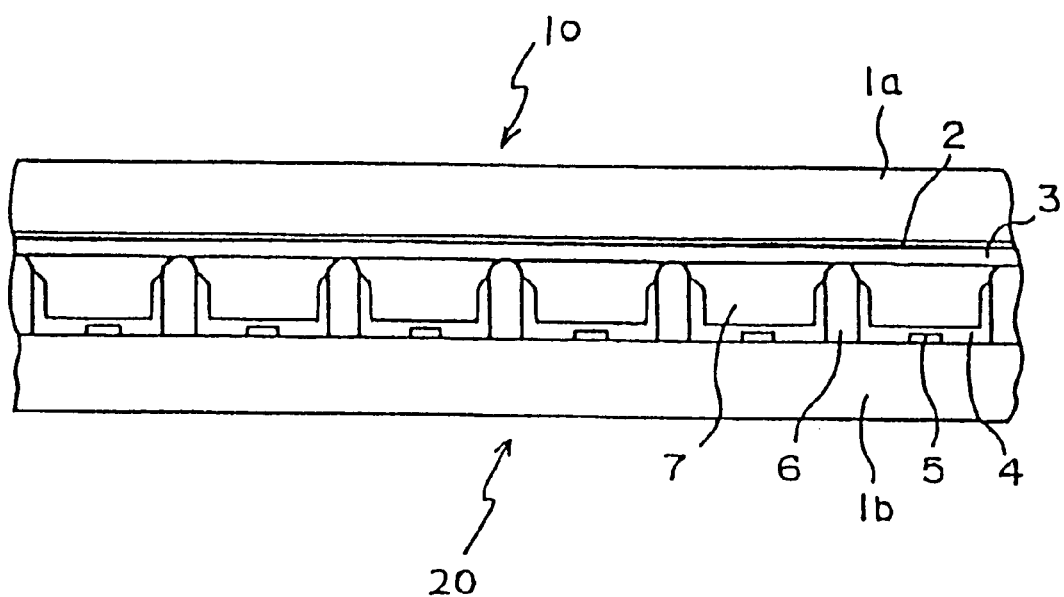
FIG. 1 is a cross-sectional view illustrating a plasma display device of the present invention.

The low melting point glass for covering electrodes of the present invention (hereinafter referred to simply as the glass of the present invention) is used usually in the form of a powder. The powder of the glass of the present invention is formed into a glass paste by using an organic vehicle or the like to impart printability, and such a paste is coated on electrodes formed on a glass substrate, followed by firing to cover the electrodes. In PDP, the glass of the present invention is preferably used for covering transparent electrodes formed on a front substrate.

The softening point of the glass of the present invention is preferably from 520 to 650° C. for the following reasons. As the above-mentioned glass substrate, one having a glass transition point of from 550 to 620° C. is usually employed. In such a case, in order to avoid deformation of the glass substrate, firing of the above-mentioned glass paste is carried out at a temperature of not higher than 620° C. In order to carry out the firing at a temperature of not higher than 620° C., the softening point of the glass of the present invention is preferably at most 650° C. Further, in order for the glass of the present invention to soften and flow to completely cover electrodes at an early stage of the firing thereby to prevent deterioration of the electrical properties of the electrodes, the softening point is preferably at most 650° C. More preferably, it is at most 640° C.

On the other hand, in the front substrate of PDP, if the electrical resistance is too high solely with transparent electrodes made of e.g. ITO or tin oxide, a metal layer of Ag or Al, or of a three layer structure of Cr—Cu—Cr (hereinafter, such a metal layer will be referred to as a metal electrode) may sometimes be formed on such transparent electrodes. If such metal electrodes are covered by a glass having a softening point of less than 520° C., the metal electrodes are likely to be corroded, or corrosion of transparent electrodes is likely to be accelerated via the metal electrodes. When the firing is carried out at a temperature of from 550 to 620° C., corrosion of electrodes will be remarkable if the metal electrodes are covered by a glass having a softening point of less than 480° C. Further, in a case where metal electrodes are covered by a glass having a softening point of from 480 to less than 520° C., corrosion of electrodes can be avoided, but bubbles in the glass layer tend to be large during the firing, whereby the transmittance of the glass layer will decrease. Accordingly, the softening point of the glass of the present invention is preferably at least 520° C. It is more preferably at least 550° C., particularly preferably at least 580° C. Further, when the softening point is at least 520° C., the glass covering layer can be made to have a single layer structure. Further, when the softening point is at least 580° C., the organic vehicle in the glass paste will completely evaporate before the softening and flowing start to take place, whereby it will be less likely that the carbon of the organic vehicle will remain in the glass covering layer to deteriorate the transmittance. Namely, the possibility that the transmittance of the glass covering layer can be made high, will increase.

As the above-mentioned glass substrate, one having an expansion coefficient of $80\times10^{-7}$ to $90\times10^{-7}/°$ C. is usually employed. Accordingly, in order to let the expansion characteristic match with such a glass substrate to prevent warping or deterioration in strength of the glass substrate, the average linear expansion coefficient in a range of from 50 to 350° C. (hereinafter referred to simply as an expansion coefficient) of the glass of the present invention is preferably from $60\times10^{-7}$ to $90\times10^{-7}/°$ C., more preferably from $70\times10^{-7}$ to $85\times10^{-7}/°$ C.

The dielectric constant of the glass of the present invention is preferably at most 10.5. If it exceeds 10.5, the capacitance of cells of PDP tends to be too large, and the electric power consumption of PDP tends to increase. The dielectric constant is more preferably at most 10.0.

The glass of the present invention is readily soluble in an acid, and the wiring portions connected to a driving circuit can also be covered by the glass of the present invention, whereby no separate covering is required. In such a case, the covering at the wiring portions connected to a driving circuit can be dissolved and removed by acid treatment. Such a covering serves to prevent oxidation of the wiring portions connected to a driving circuit, i.e. deterioration of the electrical properties, during the firing.

The glass of the present invention consists, as represented by mass percentage based on the following oxides, essentially of:

| | Mass percentage |
|---|---|
| PbO | 20 to 60%, |
| $Bi_2O_3$ | 0 to 30%, |
| $B_2O_3$ | 20 to 55%, |
| $SiO_2$ | 0 to 10%, |
| $Al_2O_3$ | 0 to 15%, |
| MgO + CaO | 0 to 35%, |
| SrO | 0 to 35%, |
| BaO | 0 to 35%, |
| ZnO | 0 to 8%; | preferably essentially of:

| | |
|---|---|
| PbO | 20 to 55%, |
| Bi$_2$O$_3$ | 0 to 20%, |
| B$_2$O$_3$ | 30 to 50%, |
| SiO$_2$ | 0 to 7%, |
| Al$_2$O$_3$ | 0 to 10%, |
| MgO + CaO | 0 to 30%, |
| SrO | 0 to 30%, |
| BaO | 0 to 30%, |
| ZnO | 0 to 5%, |

(preferred composition A);
more preferably essential of:

| | |
|---|---|
| PbO | 22 to 40%, |
| B$_2$O$_3$ | 35 to 50%, |
| SiO$_2$ | 0 to 5%, |
| Al$_2$O$_3$ | 0 to 5%, |
| SrO | 0 to 25%, |
| BaO | 0 to 30%, |
| ZnO | 0 to 5%, | and containing substantially no Bi$_2$O$_3$, MgO or CaO (more preferred composition B).

The reasons for defining the composition will be explained with reference to the mass percentage.

PbO is an essential component as it is effective for lowering the softening point and increasing the expansion coefficient. If it exceeds 60%, the dielectric constant tends to be large, or the glass tends to be colored yellow. It is preferably at most 55%. If it is less than 20%, the softening point tends to be too high, and the expansion coefficient tends to be too small, and further, a phase separation is likely to result. It is preferably at least 22%. Especially, in order to increase the transmittance, it is particularly preferably from 22 to 40%.

Bi$_2$O$_3$ is not an essential component, but may be incorporated up to 30% in order to lower the softening point and increase the expansion coefficient. If it exceeds 30%, the expansion coefficient tends to be too large, or yellowing is likely to result. It is preferably at most 20%. Especially in order to increase the transmittance, it is preferably substantially 0% i.e. at an impurity level.

B$_2$O$_3$ is an essential component to stabilize the glass. If it exceeds 55%, the softening point tends to be too high, and phase separation is likely to result. It is preferably at most 50%. If it is less than 20%, PbO or Bi$_2$O$_3$ tends to be too large, whereby the glass tends to be colored yellow. It is preferably at least 30%, more preferably at least 35%.

SiO$_2$ is not an essential component, but may incorporated up to 10% in order to stabilize the glass. If it exceeds 10%, the softening point tends to be too high, or the glass tends to hardly dissolve in an acid. It is more preferably at most 7%, particularly preferably at most 5%.

The ratio of the content of SiO$_2$ to the total content of SiO$_2$ and B$_2$O$_3$, i.e. SiO$_2$/(SiO$_2$+B$_2$O$_3$), is preferably at most 0.2. If the ratio exceeds 0.2, the glass tends to hardly dissolve in an acid. The ratio is more preferably at most 0.15.

Al$_2$O$_3$ is not an essential component, but may be incorporated up to 15% in order to stabilize the glass. If it exceeds 15%, devitrification is likely to result. It is more preferably at most 10%, particularly preferably at most 5%.

Each of MgO and CaO is not an essential component, but may be incorporated up to 35% in total, in order to improve the water resistance or in order to prevent phase separation.

If the total amount exceeds 35%, devitrification is likely to result. The total amount is preferably at most 30%. Especially in order to increase the transmittance, the total amount should preferably substantially be 0% i.e. at an impurity level.

SrO is not an essential component, but may be incorporated up to 35% in order to improve the water resistance or to prevent phase separation. If it exceeds 35%, devitrification is likely to result. It is preferably at most 30%, more preferably at most 25%.

BaO is not an essential component, but may be incorporated up to 35% in order to improve the water resistance or to prevent phase separation. If it exceeds 35%, devitrification is likely to result. It is preferably at most 30%.

ZnO is not an essential component, but may be incorporated up to 8% in order to lower the softening point. If it exceeds 8%, the dielectric constant tends to be too large. It is more preferably at most 5%.

The glass of the present invention consists essentially of the above-described components. However, other components may be added in a total amount of up to 5%. Here, 5% is an additional amount and corresponds to a content of 4.8% (=5×100/105).

For example, SnO$_2$ and/or CeO$_2$ may be contained in a total content of 4.8% in order to increase the transmittance of the glass covering layer obtainable by firing. If the total content exceeds 4.8%, coloring attributable to SnO$_2$ or CeO$_2$ tends to be distinct, whereby the transmittance tends to deteriorate.

The content of each of SnO$_2$ and CeO$_2$ is preferably at most 3%, more preferably at most 2%, most preferably at most 1.5%. Further, in the above-mentioned "preferred composition A" and "more preferred composition B", the content of each of SnO$_2$ and CeO$_2$ is preferably at most 2%, more preferably at most 1.5%.

Further, for the purpose of e.g. adjusting the softening point and the expansion coefficient or improving the stability and chemical durability of the glass, TiO$_2$, ZrO$_2$, La$_2$O$_3$ or the like may be added.

Further, in order to lower the softening point, an alkali metal oxide such as Li$_2$O, Na$_2$O or K$_2$O, or a halogen component such as F, may be added within a range not to impair the insulating property, etc.

The temperature for firing the glass of the present invention (hereinafter referred to as the firing temperature) is preferably lower than the softening point, and the difference from the softening point is preferably from 20 to 40° C. If the difference is outside this range, the transmittance tends to deteriorate. The difference is more preferably from 25 to 35° C.

Now, the glass ceramic composition for covering electrodes of the present invention (hereinafter referred to simply as the glass ceramic composition of the present invention) will be described.

The glass ceramic composition of the present invention will be made into a paste by means of an organic vehicle or the like. The glass ceramic composition of the present invention formed into a paste, will be coated on electrodes formed on a glass substrate, followed by firing to form a fired product thereby to cover the electrodes. In PDP, the glass ceramic composition of the present invention is preferably used for covering electrodes formed on a rear substrate.

The inorganic pigment is an essential component for the glass ceramic composition of the present invention and will impart light reflectance or a light shielding property to the fired product.

In order to impart light reflectance, it is preferred to employ a white inorganic pigment. Such a white inorganic pigment is preferably at least one member selected from the group consisting of $TiO_2$, $Al_2O_3$ and $ZrO_2$.

In order to impart a light-shielding property, it is preferred to employ a black inorganic pigment. Such a black inorganic pigment is preferably at least one member selected from the group consisting of $Cr_2O_3$, $MnO_2$, $Fe_2O_3$, CoO, NiO, CuO and a composite oxide thereof.

If the content of the inorganic pigment exceeds 40 parts by mass per 100 parts by mass of the powder of the glass of the present invention, the glass tends not to soften and flow sufficiently during the firing, and bubbles formed during the firing tend to remain in the interior of the fired product. The content of the inorganic pigment is preferably at most 30 parts by mass. If it is less than 0.5 part by mass, no adequate light reflectance or light shielding property tends to be obtained.

The glass ceramic composition of the present invention comprises the powder of the present invention and the powder of the inorganic pigment, as essential components. However, it may contain other components up to 30 parts by mass in a total amount per 100 parts by mass of the powder of the glass of the present invention within a range not to impair the purpose of the present invention. For example, when it is used for covering electrodes on a rear substrate of PDP, it may contain a filler such as silica, or tin oxide.

The expansion coefficient of the fired body of the glass ceramic composition of the present invention is preferably from $60 \times 10^{-7}$ to $90 \times 10^{-7}/°$ C., more preferably from $70 \times 10^{-7}$ to $85 \times 10^{-7}/°$ C., for the same reason as described above with respect to the glass of the present invention.

Now, the plasma display device of the present invention (hereinafter referred to as PDP of the present invention) will be described.

In a first embodiment of PDP of the present invention, transparent electrodes on the front substrate of PDP are covered by the glass of the present invention.

In a preferred embodiment of the first embodiment of PDP of the present invention, the front substrate having transparent electrodes formed on a glass substrate and covered by the glass of the present invention, has a transmittance of light with a wavelength of 550 nm of at least 70% and a turbidity of at most 30%. If the transmittance is less than 70% or the turbidity exceeds 30%, the image quality of PDP tends to deteriorate. The transmittance is more preferably at least 75%, particularly preferably at least 80%. Likewise, the turbidity is more preferably at most 25%, particularly preferably at most 20%. The typical values for the transmittance and the turbidity of the glass substrate per se to be used for the front substrate, are 90% and 0.4%, respectively, in a case where the thickness of the glass substrate is 2.8 mm.

The transparent electrodes are formed, for example, in a strip shape with a width of 0.5 mm, and they are formed so that the respective strip electrodes will be in parallel with one another. The distance between the centerlines of the respective strip electrodes is, for example, from 0.83 to 1.0 mm, and in such a case, the transparent electrodes will occupy from 50 to 60% of the surface of the glass substrate.

In a second embodiment of PDP of the present invention, electrodes on the rear substrate of PDP are covered by the glass ceramic composition of the present invention.

PDP of the present invention can be produced as follows, for example, when it is of an alternating current system.

As shown in FIG. 1, patterned transparent electrodes 2 and bus bars (not shown) are formed on the surface of a glass substrate 1a. Then, a powder of the glass of the present invention is coated and fired to form a glass layer 3. Finally, a magnesium oxide layer (not shown) is formed as a protecting layer, to obtain a front substrate 10. On the other hand, on a glass substrate 1b, patterned electrodes 5 for address are formed. Then, barrier ribs 6 are formed in a stripe shape, and phosphor layers 4 are further printed and fired, to obtain a rear substrate 20.

Along the periphery of the front substrate 10 and the rear substrate 20, a sealing material (not shown) is coated by a dispenser, and the front and rear substrates are assembled so that the transparent electrodes 2 face the electrodes 5 for address, followed by firing to obtain a plasma display device. Then, the interior of the plasma display device is evacuated, and a discharge gas such as He—Xe is sealed in the discharge space 7.

The above example is of an alternating system. However, the present invention is applicable also to a display device of a direct current system.

Now, the present invention will be described in further detail with reference to Examples. However, it should be understood that the present invention is by no means restricted to such specific Examples.

EXAMPLES

Lead oxide, bismuth oxide, boric anhydride, silica sand, alumina, magnesium oxide, calcium carbonate, strontium carbonate, barium carbonate, zinc oxide, tin oxide and cerium oxide were mixed so that the composition would be as shown in Table 1 by mass percentage in lines for from PbO to $CeO_2$. Then, this mixture of starting materials was melted for 1 hour by means of a platinum crucible in an electric furnace of 1,300° C. and formed into a thin sheet glass. This thin sheet glass was pulverized by a ball mill to obtain a powder of low melting point glass (Examples 1 to 35). The ratio of the content of $SiO_2$ to the total content of $SiO_2$ and $B_2O_3$, i.e. $SiO_2/(SiO_2/B_2O_3)$, is also shown in Table 1.

The softening point (unit: ° C.), the expansion coefficient (unit: $10^{-7}/°$ C.) and the dielectric constant are shown in Table 1. The dielectric constant was measured with respect to Examples 1 to 24.

Softening point: Measured by means of a differential thermal analyzer.

Expansion coefficient: The powder of a low melting point glass was shaped and then fired for 10 minutes at a firing temperature (unit: ° C.) as identified in Table 1 to obtain a fired product, which was processed into a cylindrical shape with a diameter of 5 mm and a length of 2 cm, whereupon the average linear expansion coefficient in a range of from 50 to 350° C. was measured by a thermal expansion meter.

Dielectric constant: The above fired product was processed into 50 mm×50 mm×3 mm in thickness, and electrodes were vapor-deposited on its surface, whereupon the dielectric constant was measured at a frequency of 1 MHz.

With respect to each of the low melting point glasses of Examples 1 to 24, 100 g of the powder was kneaded with 25 g of an organic vehicle to obtain a glass paste. The organic vehicle was one having ethyl cellulose dissolved in an amount of from 7 to 18% by mass percentage to diethylene glycol monobutyl ether acetate or α-terpineol.

Then, a glass substrate having a size of 10 cm×10 cm and a thickness of 2.8 mm and having a number of ITO transparent electrodes having a thickness of 200 nm and a width of 0.5 mm formed in parallel with one another so that the distance between the center lines of the respective ITO transparent electrodes, would be 1.0 mm, was prepared. This glass substrate is made of a glass having a composition represented by mass percentage being $SiO_2$: 58, $Al_2O_3$: 7, $Na_2O$: 4, $K_2O$: 6.5, MgO: 2, CaO: 5, SrO: 7, BaO: 7.5 and $ZrO_2$: 3, a glass transition point of 626° C. and an expansion coefficient of $83 \times 10^{-7}$/° C. Further, the above-mentioned ITO transparent electrodes were formed on one side of the glass substrate.

To a portion of 30 mm×30 mm having ITO transparent electrodes formed, the above-mentioned glass paste was uniformly screen-printed and then dried at 120° C. for 10 minutes. This glass substrate was heated at a temperature rising rate of 10° C./min until the temperature reached the firing temperature (unit: ° C.) as identified in Table 1 and further maintained at that temperature for 30 minutes for firing. The thickness of the glass covering layer which covered the transparent electrodes, was from 22 to 25 μm.

With respect to the glass substrate after firing, the transmittance (unit: %) of light with a wavelength of 550 nm and the turbidity (unit: %) were measured.

Transmittance: The transmittance of light with a wavelength of 550 nm was measured by means of a selfrecording spectrophotometer U-3500 (integrating sphere type) manufactured by Hitachi, Ltd. The transmittance with no sample was taken as 100%. The transmittance is preferably at least 70%.

Turbidity: A haze meter (illuminant C using a halogen bulb) manufactured by Kabushiki Kaisha Suga Shikenki, was used. The light from the halogen bulb was passed through a lens to obtain parallel light rays, which were passed through the sample, whereby the total transmittance $T_t$ and the diffused transmittance $T_d$ were measured by an integrating sphere. The turbidity was calculated by the formula:

Turbidity (%)=$(T_d/T_t) \times 100$

The turbidity is preferably at most 30%.

With respect to the low melting point glasses of Examples 25 to 35, a white inorganic pigment was mixed in an amount as identified by parts by mass in a line for inorganic pigment in Table 1 to 100 parts by mass of each powder, to obtain a mixed powder. 100 g of this mixed powder was kneaded with 25 g of an organic vehicle used in Examples 1 to 24, to obtain a glass paste.

This glass paste was screen-printed uniformly in a region of 45 mm×25 mm substantially at the center of one side of the above-mentioned glass substrate, and then dried at 120° C. for 10 minutes. This glass substrate was heated at a temperature rising rate of 10° C./min to the firing temperature shown in Table 1 and further maintained at that temperature for 30 minutes for firing. The thickness of the glass covering layer formed on the glass substrate was 20 μm.

To evaluate whether or not the glass covering layers obtained in Examples 1 to 35 were readily soluble in an acid, an acid solubility test was carried out as described below, whereby the acid-soluble time (unit: min) was measured. The results are also shown in Table 1.

Acid solubility test: The glass substrate having the glass covering layer formed, was immersed for the maximum period of 60 minutes in nitric acid having a mass percentage concentration of 5%, and the weight of the glass substrate after immersion was measured. The immersion time where the weight of the glass substrate after immersion became the same as the weight of the glass substrate before immersion, was obtained. This immersion time was taken as the acid-soluble time. The acid-soluble time is preferably at most 10 minutes.

Examples 1 to 21 are Examples useful for covering transparent electrodes on the front substrate of PDP, and Examples 25 to 34 are Examples useful for covering electrodes on the rear substrate of PDP. Examples 22 to 24 and 35 are Comparative Examples.

TABLE 1

| Examples | 1 | 2 | 3 | 4 | 5 | 6 | 7 | 8 |
|---|---|---|---|---|---|---|---|---|
| PbO | 45 | 44 | 50 | 38 | 32 | 46 | 31 | 40 |
| $B_2O_3$ | 41 | 46 | 43 | 52 | 43 | 45 | 38 | 37 |
| $SiO_2$ | 3 | 3 | 0 | 3 | 3 | 4 | 3 | 2 |
| $Al_2O_3$ | 0 | 0 | 0 | 0 | 0 | 0 | 0 | 0 |
| MgO | 11 | 7 | 7 | 7 | 0 | 5 | 0 | 0 |
| CaO | 8 | 0 | 0 | 0 | 0 | 0 | 0 | 0 |
| SrO | 0 | 0 | 0 | 0 | 0 | 0 | 0 | 0 |
| BaO | 0 | 0 | 0 | 0 | 22 | 0 | 28 | 21 |
| ZnO | 0 | 0 | 0 | 0 | 0 | 0 | 0 | 0 |
| $SnO_2$ | 0 | 0 | 0 | 0 | 0 | 0 | 0 | 0 |
| $CeO_2$ | 0 | 0 | 0 | 0 | 0 | 0 | 0 | 0 |
| $SiO_2/(SiO_2 + B_2O_3)$ | 0.07 | 0.06 | 0 | 0.07 | 0.07 | 0.06 | 0.07 | 0.05 |
| Softening point | 620 | 610 | 680 | 630 | 610 | 608 | 610 | 590 |
| Expansion coefficient | 73 | 67 | 78 | 63 | 73 | 64 | 82 | 75 |
| Firing temp. | 590 | 580 | 570 | 600 | 590 | 590 | 570 | 560 |
| Dielectric constant | 9.6 | 9.3 | 9.7 | 7.9 | 8.3 | 8.7 | 9.3 | 10.0 |
| Acid-soluble time | 3 | 3 | 4 | 5 | 2 | 3 | 4 | 2 |
| Transmittance | 75 | 78 | 75 | 80 | 83 | 78 | 83 | 78 |
| Turbidity | 24 | 23 | 23 | 20 | 19 | 22 | 11 | 18 |

| Examples | 9 | 10 | 11 | 12 | 13 | 14 | 15 | 16 |
|---|---|---|---|---|---|---|---|---|
| PbO | 37 | 34 | 40 | 41 | 33 | 34 | 49 | 34 |
| $B_2O_3$ | 50 | 47 | 40 | 42 | 40 | 38 | 38 | 38 |
| $SiO_2$ | 4 | 3 | 7 | 5 | 3 | 3 | 3.2 | 3 |
| $Al_2O_3$ | 0 | 0 | 0 | 0 | 0 | 0 | 0 | 0 |
| MgO | 0 | 0 | 8 | 7 | 0 | 0 | 9 | 0 |
| CaO | 9 | 0 | 0 | 0 | 0 | 0 | 0 | 0 |
| SrO | 0 | 16 | 0 | 0 | 0 | 0 | 0 | 0 |
| BaO | 0 | 0 | 0 | 0 | 24 | 24.3 | 8 | 24.2 |
| ZnO | 8 | 0 | 5 | 0 | 0 | 0 | 0 | 0 |
| $SnO_2$ | 0 | 0 | 0 | 0 | 0 | 0.7 | 0.8 | 0 |
| $CeO_2$ | 0 | 0 | 0 | 0 | 0 | 0 | 0 | 0.8 |
| $SiO_2/(SiO_2 + B_2O_3)$ | 0.07 | 0.06 | 0.15 | 0.11 | 0.87 | 0.07 | 0.08 | 0.07 |
| Softening point | 630 | 630 | 600 | 620 | 600 | 610 | 610 | 610 |
| Expansion coefficient | 65 | 67 | 65 | 61 | 76 | 88 | 72 | 80 |
| Firing temp. | 590 | 590 | 570 | 590 | 570 | 580 | 590 | 580 |
| Dielectric constant | 8.0 | 8.2 | 9.5 | 8.3 | 8.8 | 9.2 | 9.3 | 9.4 |
| Acid-soluble time | 4 | 3 | 9 | 7 | 3 | 4 | 5 | 4 |
| Transmittance | 81 | 81 | 78 | 77 | 83 | 80 | 76 | 82 |
| Turbidity | 18 | 15 | 21 | 25 | 10 | 15 | 20 | 11 |

| Examples | 17 | 18 | 19 | 20 | 21 | 22 | 23 | 24 |
|---|---|---|---|---|---|---|---|---|
| PbO | 34 | 34 | 34 | 34 | 31 | 12 | 44 | 32 |
| $B_2O_3$ | 38 | 38 | 38 | 38 | 39 | 52 | 40 | 13 |
| $SiO_2$ | 3 | 3 | 2.9 | 3 | 3 | 3 | 14 | 26 |
| $Al_2O_3$ | 0 | 0 | 0 | 0 | 0 | 0 | 2 | 0 |
| MgO | 0 | 0 | 0 | 0 | 0 | 0 | 0 | 9 |
| CaO | 0 | 0 | 0 | 0 | 0 | 0 | 0 | 0 |
| SrO | 0 | 0 | 0 | 0 | 0 | 0 | 0 | 0 |
| BaO | 24.6 | 24.9 | 24 | 24.7 | 21.6 | 33 | 0 | 29 |
| ZnO | 0 | 0 | 0 | 0 | 4 | 0 | 0 | 0 |
| $SnO_2$ | 0.4 | 0.1 | 0 | 0 | 1.4 | 0 | 0 | 0 |
| $CeO_2$ | 0 | 0 | 1.1 | 0.3 | 0 | 0 | 0 | 0 |
| $SiO_2/(SiO_2 + B_2O_3)$ | 0.07 | 0.07 | 0.07 | 0.07 | 0.07 | 0.05 | 0.26 | 0.67 |
| Softening point | 610 | 610 | 610 | 610 | 610 | 660 | 570 | 670 |
| Expansion coefficient | 80 | 80 | 80 | 80 | 73 | 68 | 58 | 62 |

TABLE 1-continued

| Firing temp. | 580 | 580 | 580 | 580 | 590 | 600 | 550 | 600 |
|---|---|---|---|---|---|---|---|---|
| Dielectric constant | 9.2 | 9.2 | 9.4 | 9.4 | 8.3 | 6.5 | 6.7 | 9.3 |
| Acid-soluble time | 4 | 4 | 5 | 4 | 2 | 5 | 25 | 60 or more |
| Transmittance | 81 | 82 | 80 | 82 | 83 | 35 | 75 | 42 |
| Turbidity | 13 | 12 | 15 | 12 | 19 | 93 | 30 | 92 |

| Examples | 25 | 26 | 27 | 28 | 29 | 30 | 31 | 32 |
|---|---|---|---|---|---|---|---|---|
| PbO | 57 | 56 | 32 | 53 | 56 | 40 | 51 | 51 |
| $Bi_2O_3$ | 0 | 0 | 0 | 0 | 0 | 10 | 0 | 0 |
| $B_2O_3$ | 32 | 35 | 43 | 36 | 34 | 35 | 46 | 46 |
| $SiO_2$ | 2 | 0 | 3 | 3 | 1 | 0 | 0 | 0 |
| $Al_2O_3$ | 9 | 9 | 0 | 8 | 9 | 9 | 3 | 2.7 |
| BaO | 0 | 0 | 22 | 0 | 0 | 0 | 0 | 0 |
| ZnO | 0 | 0 | 0 | 0 | 0 | 6 | 0 | 0 |
| $SnO_2$ | 0 | 0 | 0 | 0 | 0 | 0 | 0 | 0.3 |
| $CeO_2$ | 0 | 0 | 0 | 0 | 0 | 0 | 0 | 0 |
| $SiO_2/(SiO_2 + B_2O_3)$ | 0.06 | 0 | 0.07 | 0.08 | 0.03 | 0 | 0 | 0 |
| Softening point | 540 | 547 | 610 | 545 | 540 | 560 | 550 | 550 |
| Expansion coefficient | 69 | 69 | 73 | 68 | 68 | 74 | 76 | 76 |
| Inorganic pigment ($TiO_2$) | 10 | 20 | 20 | 20 | 20 | 10 | 10 | 10 |
| Inorganic pigment ($Al_2O_3$) | 10 | 0 | 0 | 0 | 0 | 0 | 0 | 0 |
| Inorganic pigment ($ZrO_2$) | 0 | 0 | 0 | 0 | 0 | 0 | 0 | 0 |
| Firing temp. | 540 | 560 | 590 | 580 | 560 | 580 | 570 | 570 |
| Acid-soluble time | 7 | 4 | 6 | 6 | 6 | 5 | 4 | 4 |

| Examples | 33 | 34 | 35 |
|---|---|---|---|
| PbO | 57 | 56.1 | 53 |
| $Bi_2O_3$ | 0 | 0 | 0 |
| $B_2O_3$ | 32 | 35 | 30 |
| $SiO_2$ | 2 | 0 | 15 |
| $Al_2O_3$ | 8.5 | 8 | 2 |
| BaO | 0 | 0 | 0 |
| ZnO | 0 | 0 | 0 |
| $SnO_2$ | 0.5 | 0 | 0 |
| $CeO_2$ | 0 | 0.9 | 0 |
| $SiO_2/(SiO_2 + B_2O_3)$ | 0.06 | 0 | 0.33 |
| Softening point | 540 | 550 | 590 |
| Expansion coefficient | 69 | 69 | 64 |
| Inorganic pigment ($TiO_2$) | 10 | 20 | 5 |
| Inorganic pigment ($Al_2O_3$) | 10 | 0 | 0 |
| Inorganic pigment ($ZrO_2$) | 0 | 0 | 15 |
| Firing temp. | 540 | 560 | 590 |
| Acid-soluble time | 7 | 4 | 20 |

By using the glass of the present invention, the glass covering layer to cover transparent electrodes on a glass substrate, can be made to have a single layer structure, whereby the number of process steps can be reduced. Further, the dielectric constant of the glass covering layer can be made low, whereby the electric power consumption of PDP can be saved.

The glass of the present invention or the glass covering layer formed on a glass substrate by means of the glass ceramic composition of the present invention, is readily soluble in an acid and can be used for covering wiring portions connected to a driving circuit. Accordingly, it will be unnecessary to apply a covering readily soluble in an acid only to the wiring portions connected to a driving circuit.

Further, the glass of the present invention can be used as a low melting point glass to be used for the glass ceramic composition of the present invention and thus is useful not only for the front substrate but also for the rear substrate of PDP. The front substrate of PDP of the present invention has high transmittance and provides an excellent image quality. Further, the production cost can be reduced, as it is produced by means of the glass of the present invention or the glass ceramic composition of the present invention.

What is claimed is:

1. A low melting point glass for covering electrodes, consisting, as represented by mass percentage based on the following oxides, essentially of:

| | Mass percentage |
|---|---|
| PbO | 20 to 60%, |
| $Bi_2O_3$ | 0 to 30%, |
| $B_2O_3$ | 20 to 55%, |
| $SiO_2$ | 0 to 10%, |
| $Al_2O_3$ | 0 to 15%, |
| MgO + CaO | 0 to 35%, |
| SrO | 0 to 35%, |
| BaO | 0 to 35%, |
| ZnO | 0 to 8%, | wherein $PbO/B_2O_3$ is not higher than 57/32 and the low melting point glass has a softening point of from 520 to 650° C.

2. The low melting point glass for covering electrodes according to claim 1, which further contains $SnO_2$ and/or $CeO_2$ in a total content of at most 4.8% by mass percentage.

3. The low melting point glass for covering electrodes according to claim 1, which has an average linear expansion coefficient in a range of from 50 to 350° C. of from $60 \times 10^{-7}$ to $90 \times 10^{-7}$/° C.

4. The low melting point glass for covering electrodes according to claim 1, which has a dielectric constant of at most 10.5.

5. A glass ceramic composition for covering electrodes, comprising a powder of the low melting point glass for covering electrodes as defined in claim 1 and a powder of an inorganic pigment, wherein the powder of an inorganic pigment is contained in a proportion of from 0.5 to 40 parts by mass per 100 parts by mass of the powder of the low melting point glass for covering electrodes.

6. The glass ceramic composition for covering electrodes according to claim 5, wherein the inorganic pigment is at least one member selected from the group consisting of $TiO_2$, $Al_2O_3$ and $ZrO_2$.

7. The glass ceramic composition for covering electrodes according to claim 5, which has an average linear expansion coefficient in a range of from 50 to 350° C. of from $60 \times 10^{-7}$ to $90 \times 10^{-7}$/° C.

8. A plasma display device having a front substrate, wherein transparent electrodes formed on a glass substrate constituting the front substrate are covered by the low melting point glass for covering electrodes as defined in claim 1.

9. The plasma display device according to claim 8, wherein the front substrate has a transmittance of light with a wavelength of 550 nm of at least 70% and a turbidity of at most 30%.

10. A plasma display device having a rear substrate, wherein electrodes formed on a glass substrate constituting the rear substrate are covered with a fired product of the glass ceramic composition for covering electrodes as defined in claim 5.

11. The low melting point glass for covering electrodes according to claim 1, wherein the ratio of the content of $SiO_2$ to the total content of $SiO_2$ and $B_2O_3$ is at most 0.2.

* * * * *